US008310706B2

(12) United States Patent
Xiao et al.

(10) Patent No.: US 8,310,706 B2
(45) Date of Patent: Nov. 13, 2012

(54) DYNAMIC AND REAL-TIME PRINT SCHEMA DOCUMENTS

(75) Inventors: Zhenning Xiao, Renton, WA (US); Senthil K. Selvaraj, Snoqualmie, WA (US)

(73) Assignee: Ricoh Company, Ltd., Tokyo (JP)

( * ) Notice: Subject to any disclaimer, the term of this patent is extended or adjusted under 35 U.S.C. 154(b) by 503 days.

(21) Appl. No.: 12/533,999

(22) Filed: Jul. 31, 2009

(65) Prior Publication Data

US 2011/0026071 A1 Feb. 3, 2011

(51) Int. Cl.
*G06F 3/12* (2006.01)
*G06F 9/44* (2006.01)

(52) U.S. Cl. ........ 358/1.15; 358/1.1; 358/1.9; 358/1.13; 709/217; 709/220; 709/224; 717/168; 717/170; 717/171; 717/173

(58) Field of Classification Search .................. 358/1.1, 358/1.13, 1.15, 1.18; 709/217–223
See application file for complete search history.

(56) References Cited

U.S. PATENT DOCUMENTS 5,467,434 A 11/1995 Hower et al.
6,594,028 B1 * 7/2003 Hamamoto et al. ......... 358/1.15
6,607,314 B1 * 8/2003 McCannon et al. ............ 400/62
7,304,758 B2 * 12/2007 Ferlitsch ...................... 358/1.15
7,821,667 B2 * 10/2010 Bahl et al. ..................... 358/1.18
7,903,267 B2 * 3/2011 Yasui et al. .................. 358/1.13
2002/0067504 A1 * 6/2002 Salgado et al. .............. 358/1.15
2002/0171857 A1 11/2002 Hisatomi et al.
2003/0048473 A1 * 3/2003 Rosen .......................... 358/1.15
2003/0184782 A1 10/2003 Perkins et al.
2003/0217124 A1 * 11/2003 Parry ............................ 709/220
2003/0231328 A1 12/2003 Chapin et al.
2004/0111418 A1 6/2004 Nguyen et al.
2005/0012951 A1 * 1/2005 Madril et al. ................ 358/1.13
2005/0046886 A1 3/2005 Ferlitsch
2006/0023244 A1 2/2006 Mitsui (Continued)

FOREIGN PATENT DOCUMENTS

JP 2003233482 A 8/2003

(Continued)

OTHER PUBLICATIONS

European Patent Office, "European Search Report", application No. EP 07250298, dated Feb. 23, 2010, 8 pages.

(Continued)

*Primary Examiner* — Twyler Haskins
*Assistant Examiner* — Dennis Dicker
(74) *Attorney, Agent, or Firm* — Hickman Palermo Truong Becker Bingham Wong LLP; Daniel D. Ledesma

(57) ABSTRACT

A method and apparatus is provided for printing to a Web services-enabled printing device. A print driver executing on a client device receives, from the printing device, printing device capability data that specifies a plurality of features and options currently supported by the printing device. The print driver generates a second version of a PrintCapabilities Document from a first version. The PrintCapabilities Document indicates, in XML, a particular print feature and one or more options for the particular print feature that are indicated in the printing device capability data. A user interface may be generated based on the second version. As a result of one or more user (and/or default) selections, a PrintTicket Document may be generated that indicates that an option of the particular print feature is selected. The print driver generates a print job ticket based the PrintTicket Document.

17 Claims, 10 Drawing Sheets

U.S. PATENT DOCUMENTS

| | | | | |
|---|---|---|---|---|
| 2006/0109505 | A1* | 5/2006 | Ha et al. | 358/1.15 |
| 2006/0120349 | A1 | 6/2006 | Taylor et al. | |
| 2007/0136485 | A1 | 6/2007 | Mitsui | |
| 2007/0174521 | A1 | 7/2007 | Aritomi | |
| 2007/0214409 | A1 | 9/2007 | Miyata | |
| 2008/0068635 | A1 | 3/2008 | Asano | |
| 2008/0301277 | A1 | 12/2008 | Tsujiguchi | |
| 2009/0033976 | A1* | 2/2009 | Ding | 358/1.15 |
| 2009/0086259 | A1* | 4/2009 | Bailey et al. | 358/1.15 |
| 2009/0190150 | A1* | 7/2009 | Selvaraj et al. | 358/1.13 |
| 2010/0027040 | A1 | 2/2010 | Kuroda | |
| 2010/0225958 | A1 | 9/2010 | Selvaraj et al. | |
| 2011/0026071 | A1 | 2/2011 | Xiao et al. | |
| 2011/0026072 | A1 | 2/2011 | Xiao | |

FOREIGN PATENT DOCUMENTS

| | | | |
|---|---|---|---|
| JP | 2005148953 | A | 6/2005 |
| JP | 2005228148 | A | 8/2005 |
| WO | WO 2004/070607 | A1 | 8/2004 |

OTHER PUBLICATIONS

U.S. Appl. No. 11/846,884, filed Aug. 29, 2007, Advisory Action, Sep. 19, 2011.

U.S. Appl. No. 11/846,884, filed Aug. 29, 2007, Office Action, Oct. 26, 2011.

U.S. Appl. No. 11/846,884, filed Aug. 29, 2007, Office Action, Aug. 2, 2010.

U.S. Appl. No. 11/345,503, filed Jan. 31, 2006, Notice of Allowance, May 24, 2010.

* cited by examiner

PRINTING DEVICE CAPABILITIES DATA 310

```xml
<wprt:Sides>
    <wprt:AllowedValue>OneSided</wprt:AllowedValue>
    <wprt:AllowedValue>TwoSidedLongEdge</wprt:AllowedValue>
    <wprt:AllowedValue>TwoSidedShortEdge</wprt:AllowedValue>
</wprt:Sides>
```

PRINTER DESCRIPTION DATA 320

```xml
<DeviceFeature Value="Sides">
  <PDLKeyword Value="Duplex"/>
  <rcNameID Value="TWO_SIDED_PRINTING_DISPLAY"/>
  <DisplayName xml:lang="en-US">Print on Both Sides</DisplayName>
  <FeatureOption Value="OneSided">
    <PDLKeyword Value="NONE"/>
    <rcNameID Value="NONE_DISPLAY"/>
    <DisplayName xml:lang="en-US">None</DisplayName>
  </FeatureOption>
  <FeatureOption Value="TwoSidedLongEdge">
    <PDLKeyword Value="VERTICAL"/>
    <rcNameID Value="FLIP_ON_LONG_EDGE_DISPLAY"/>
    <DisplayName xml:lang="en-US">Flip on long edge</DisplayName>
    </FeatureOption>
  <FeatureOption Value="TwoSidedShortEdge">
    <PDLKeyword Value="HORIZONTAL"/>
    <rcNameID Value="FLIP_ON_SHORT_EDGE_DISPLAY"/>
    <DisplayName xml:lang="en-US">Flip on short edge</DisplayName>
  </FeatureOption>
</DeviceFeature>
```

*FIG. 3A*

PRINTCAPABILITIES DOCUMENT 330

```
<psf:Feature name="psk:JobDuplexAllDocumentsContiguously">
    <psf:Property name="psk:SelectionType">
        <psf:Value xsi:type="xsd:QName">psk:PickOne</psf:Value>
    </psf:Property>
    <psf:Property name="psk:DisplayName">
        <psf:Value xsi:type="xsd:string">Print on Both Sides</psf:Value>
    </psf:Property>
    <psf:Option name="psk:OneSided" constrained="psk:None">
        <psf:Property name="psk:DisplayName">
            <psf:Value xsi:type="xsd:string">None</psf:Value>
        </psf:Property>
    </psf:Option>
    <psf:Option name="psk:TwoSidedLongEdge" constrained="psk:None">
        <psf:Property name="psk:DisplayName">
            <psf:Value xsi:type="xsd:string">Flip on long edge</psf:Value>
        </psf:Property>
    </psf:Option>
    <psf:Option name="psk:TwoSidedShortEdge" constrained="psk:None">
        <psf:Property name="psk:DisplayName">
            <psf:Value xsi:type="xsd:string">Flip on short edge</psf:Value>
        </psf:Property>
    </psf:Option>
</psf:Feature>
```

PRINTTICKET DOCUMENT 340

```
<psf:Feature name="psk:JobDuplexAllDocumentsContiguously">
        <psf:Option name="psk:OneSided" />
</psf:Feature>
```

DYNAMIC AND REAL-TIME PRINT SCHEMA DOCUMENTS

CROSS-REFERENCE TO RELATED APPLICATIONS

This application is related to U.S. patent application Ser. No. 12/399,884, filed Mar. 6, 2009 and U.S. patent application Ser. No. 12/534,014, filed Jul. 31, 2009, the entire contents of which is hereby incorporated by reference as if fully set forth herein for all purposes.

FIELD OF THE INVENTION

The present invention relates generally to printing systems and printing to Web services-enabled printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web Services

The World Wide Web Consortium ("W3C") is an international consortium that develops standards for the World Wide Web. The W3C defines a "Web service" as a software system that is designed to support interoperable machine-to-machine interaction over a network. This definition encompasses many different systems, but in common usage, the term refers to those services that use Simple Object Access Protocol (SOAP)-formatted Extensible Markup Language ("XML") envelopes and that have their interfaces described using Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define Web services are intentionally modular, and, as a result, there is no one document that defines all Web services. Instead, there are a few core specifications that are supplemented by other specifications as the circumstances and choice of technology dictate. Common core specifications are SOAP, WSDL, WS-Discovery, WS-MetadataExchange, WS-Addressing, and WS-Security. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows Web service interfaces to be described along with the details of those interfaces' bindings to specific protocols. WSDL is typically used to generate server and client code, and for configuration.

WSD Devices

Some devices that host one or more Web services also implement the Devices Profile for Web Services (DPWS) specification. Such devices are referred to as Web Services for Devices (WSD) devices. Non-limiting examples of WSD devices include scanners, printers, copiers, facsimile machines, archiving devices, and multifunction peripherals (MFPs) that include provide multiple services (e.g., printing, copying, and scanning services) on the same device.

DPWS defines a minimal set of implementation constraints to enable secure Web Service messaging, discovery, description, and eventing on devices. The DPWS specification defines an architecture in which devices run two types of services: hosting services and hosted services. Hosting services are directly associated to a device and play an important part in the device discovery process. Hosted services are mostly functional and depend on their hosting device for discovery.

DPWS builds on the following core Web Services standards: WSDL 1.1, XML Schema, SOAP 1.2, WS-Addressing, and further comprises WS-MetadataExchange, WS-Transfer, WS-Policy, WS-Security, WS-Discovery and WS-Eventing. The latest DPWS specification (published in February, 2006) is incorporated herein by reference as if fully disclosed herein. A device that implements one or more Web Services standards is referred to herein as a Web services-enabled device.

Service Specifications

Some Web services conform to certain service specifications. A service specification (e.g., WSD Print Service specification) describes the minimum set of APIs that a Web service must implement in order to be compliant with that service specification. For example, a WSD Print Service specification defines (a) a set of operations (e.g., described in a WSDL file) that a print Web service is capable of processing and (b) the events that the print Web service generates. A WSD Scanner Service specification defines (a) a set of operations that a scan Web service is capable of processing and (b) the events that the scan Web service generates.

Service specifications may be standardized by W3C or another Web Services standardizing body, such as the Organization for the Advancement of Structured Information Standards (OASIS).

Printing to a Printing Device

When a user wishes to print an electronic document on a printing device, a print subsystem on the user's client device processes application data generated by an application program and generates print data. The print data includes all the information required by the printing device to print the electronic document. For example, a user creates an electronic document using a word processing application on a PC. The user then selects a print option in the word processing application to request that the electronic document be printed to a particular printer. The print subsystem on the PC processes this request by processing the application data generated by the word processing application to generate print data in a format supported by the particular printer. The print subsystem then sends the print data to the particular printer. Generally, print data is sent to a printing device as part of a print job that is recognized by the printing device.

Generating print data conventionally involves the use of a print driver that is specific to the target printing device. That is, each print driver converts print data into a format supported by the target printing device. Therefore, in order for a client device to correctly print to a particular printing device, the client device must have installed on it the print driver for the particular printing device. One of the problems with this approach is that the print driver must be current for the target printing device. If the configuration of a printing device changes, then a new print driver must be generated and distributed to a large number of users. Printing device manufacturers attempt to provide current print drivers available on their Website for download, but many users do not know to check a manufacturer's Website for current drivers. Furthermore, many print drivers must be digitally certified by the company that makes the operating system or by printing device manufactures, which can be time consuming and expensive. Any changes to a print driver typically trigger a digital re-certification requirement.

DEVMODE and Print Schema Documents

DEVMODE is a basic data structure that the Windows spooling system uses to process print data. DEVMODE contains the device settings selected by a user (and/or set as default settings) as part of processing a print job. To create a print job from a Windows application, a user interface is presented to a user to allow the user to select a number of options for various features that are currently supported by a particular printing device. The application stores the user's selections into a DEVMODE structure. The application then sends the DEVMODE structure to the print driver of the particular printing device. The print driver interprets the DEVMODE settings and renders the print data into a format that is acceptable by the particular printing device.

Microsoft later introduced Print Schema documents to replace the use of the DEVMODE data structure in order to address some of the disadvantages of the DEVMODE data structure. For example, Print Schema documents are in a readable format (i.e., XML) rather than in a binary format. In this way, an application program can read the XML data in a Print Schema document and generate a user interface to allow a user to select options of various device features indicated in the Print Schema document. However, like the traditional DEVMODE data structure, Print Schema documents are kept isolated from changes in the device features supported by a corresponding printing device. In other words, if there is a change in set of available device features (e.g., addition or deletion of a device feature), then that change is not reflected in the Print Schema document.

SUMMARY

Techniques are provided for printing to a Web services-enabled printing device. In an embodiment, a print driver, executing on a client device, receives, from a Web services-enabled printing device, printing device capability data that specifies a plurality of features and options currently supported by the Web services-enabled printing device. In response to receiving the printing device capability data, the print driver generates a second version of a PrintCapabilities Document that is different than a first version of the PrintCapabilities Document. The first version indicates a first plurality of features that were previously supported by the Web services-enabled printing device. The second version indicates a second plurality of features that are currently supported by the Web services-enabled printing device. The first plurality of features are different than the second plurality of features. Data in the first and second version is represented in XML. A user interface is generated based on the second version of the PrintCapabilities Document. In response to one or more user selections, a particular document is generated that indicates that an option is selected for each feature of a set of features of the second plurality of features.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A-B are diagrams that depicts an example of a portion of printing device capabilities data, printer description data, a PrintCapabilities Document, and a PrintTicket Document, according to an embodiment of the invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Overview
II. Printing System Architecture
III. Generating Printer Description Data
IV. Printcapabilities Document
V. Updating Printcapabilities Document
VI. Implementation Mechanisms

I. Overview

An approach is provided for printing to a Web services-enabled printing device. A print driver generates (or updates) a PrintCapabilities Document based on a new set of features specified in printing device capabilities data retrieved from a Web services-enabled printing device, e.g., using WSD communication protocols. The PrintCapabilities Document is a document defined by Microsoft's Print Schema technology. The new feature(s) and options are saved in the PrintCapabilities Document. An application program later accesses the PrintCapabilities Document and may create a PrintTicket Document to indicate which features and options a user selected. The PrintTicket Document is another document defined by Microsoft's Print Schema technology. The PrintTicket Document is passed to the print driver, which generates a print job ticket based at least upon the PrintTicket Document. The print driver causes the print job ticket and print data to be transmitted to the Web services-enabled printing device for processing. Embodiments of the invention also include the print driver subscribing to receive events (generated by the Web services-enabled printing device) that indicate when a change has occurred to the installed features and options. The print driver is configured to, in response to such an event, update the PrintCapabilities Document.

This approach provides a dynamically synchronized PrintCapabilities Document that reflects the current features and options of a Web services-enabled printing device. A print driver is able to be notified whenever any device feature changes, such as through an event generated when a new device feature is added or when a device feature is removed. Accordingly, a user can always initiate a print job based on the current features supported by the Web services-enabled printing device. Also, a graphical user interface (GUI) can be generated, for example by a print driver or an application program, where the GUI includes the current features and options of the Web services-enabled printing device.

Figure 1:
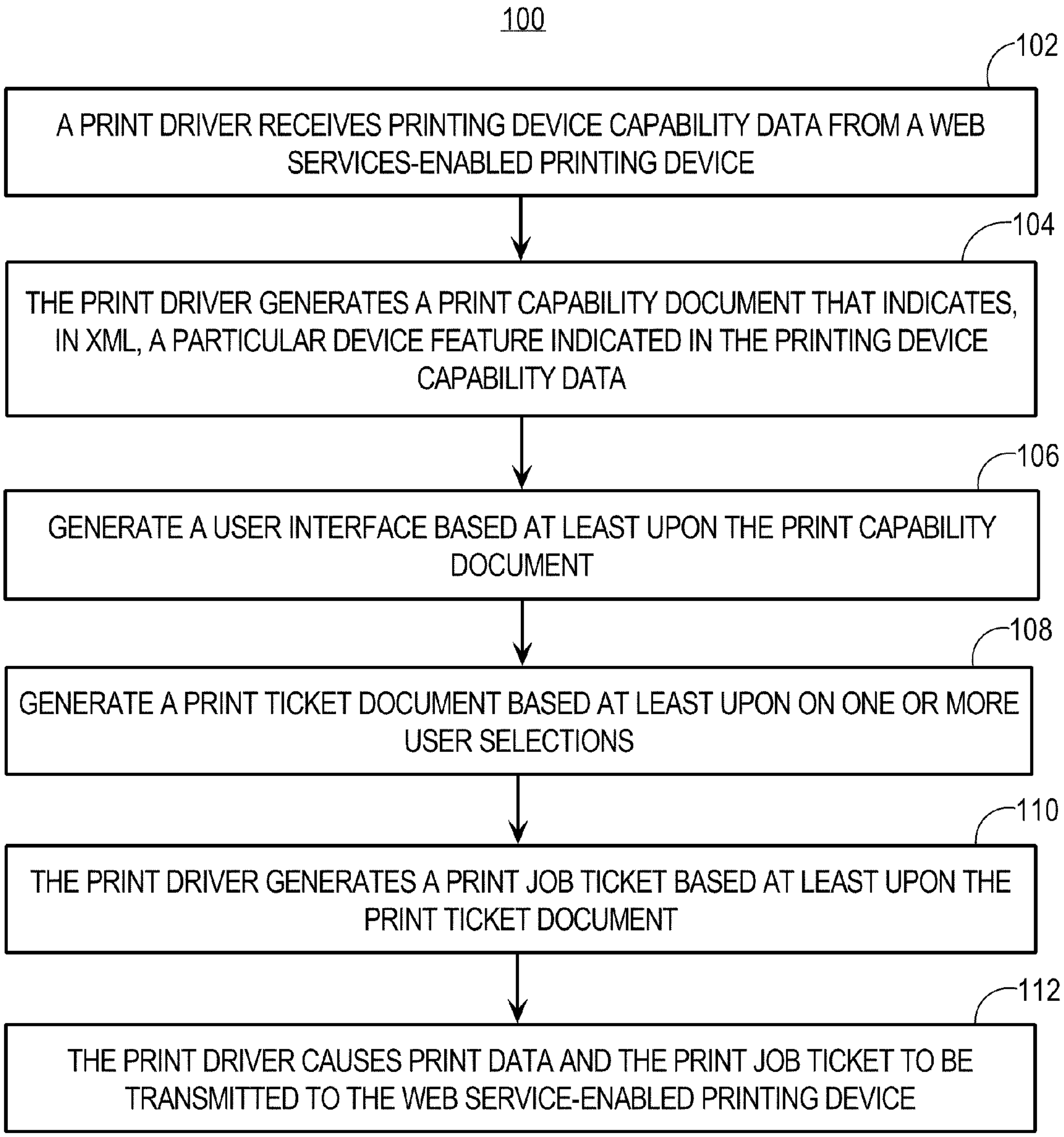
FIG. 1 is a flow diagram that depicts an approach for printing to a printing device, according to one embodiment of the invention.

FIG. 1 is a flow diagram that depicts an approach for printing to a printing device, according to one embodiment of the invention. In step 102, a print driver, executing on a client device, receives printing device capabilities data from a Web services-enabled printing device. The printing device capabilities data specifies a plurality of features and options currently supported by the Web services-enabled printing device.

In step 104, the print driver generates a PrintCapabilities Document that indicates, in XML, a particular device feature that is indicated in the printing device capability data. The PrintCapabilities Document may be generated based at least upon the printing device capability data or upon printer description data (described in more detail below). The print driver generates printer description data based at least upon the printing device capabilities data.

In step 106, a user interface is generated based at least upon the PrintCapabilities Document. The user interface displays features and options that are currently supported by the Web services-enabled printing device. Either the print driver or an application program, for example, generates the user interface.

In step 108, a PrintTicket Document is generated, either by the application program or the print driver. The PrintTicket Document indicates selected features and options. The selected features and options may be default selections and/or selections from a user.

In step 110, the print driver generates print data and a print job ticket based at least upon the PrintTicket Document.

In step 112, the print driver causes the print data and the print job ticket to be transmitted to the Web services-enabled printing device for processing.

II. Printing System Architecture

Figure 2:
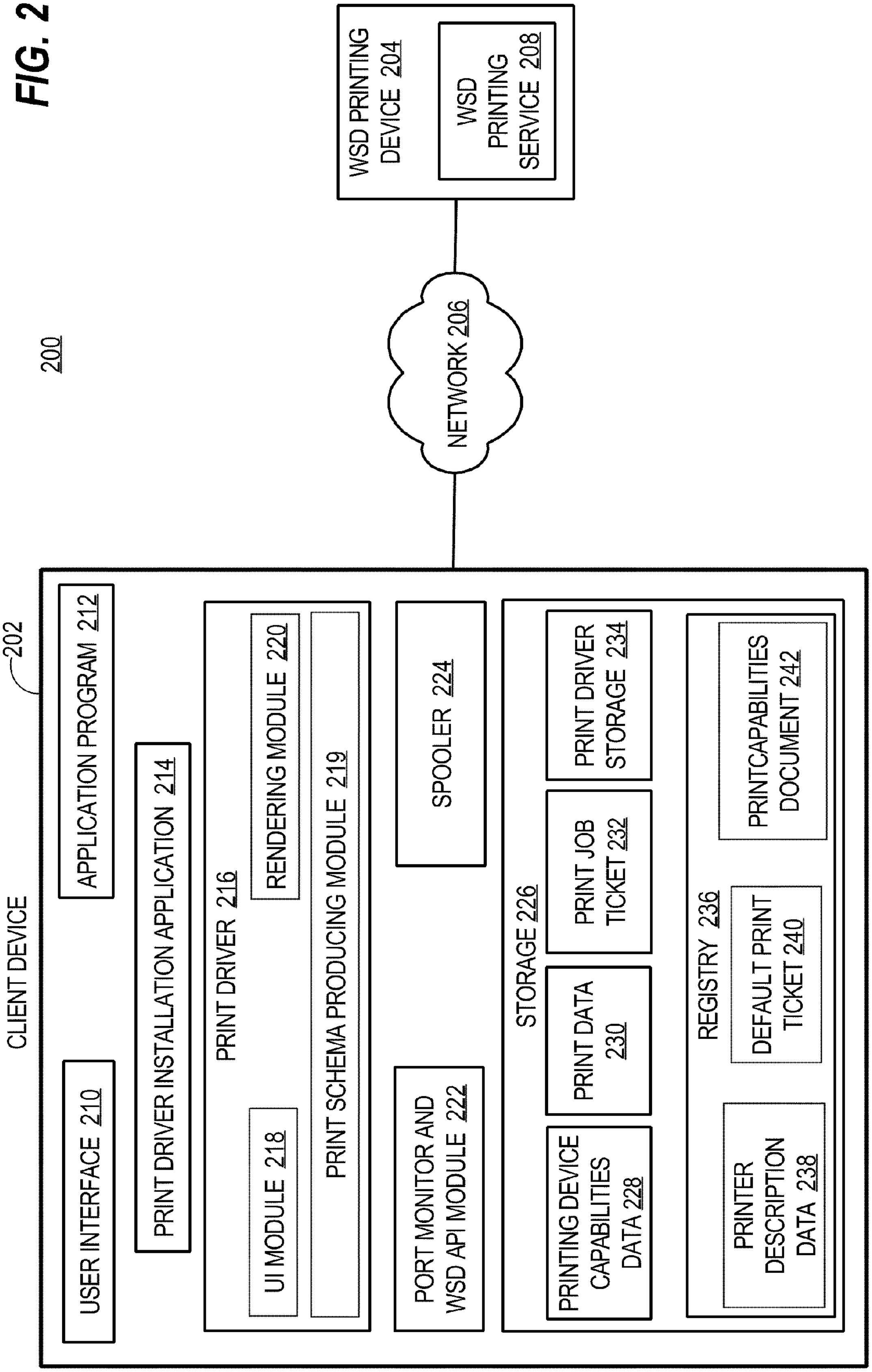
FIG. 2 is a block diagram that depicts an example printing arrangement, according to an embodiment of the invention.

FIG. 2 is a block diagram that depicts an example printing arrangement 200 that includes a client device 202 and a Web services-enabled printing device 204 (referred to hereinafter as "printing device 204") communicatively coupled via a network 206. Network 206 may be implemented by any medium or mechanism that provides for the exchange of data between client device 202 and printing device 204. Examples of network 206 include, without limitation, a network such as a Local Area Network (LAN), Wide Area Network (WAN), Ethernet or the Internet, or one or more terrestrial, satellite or wireless links.

Printing device 204 includes a Web services-enabled printing service 208. Printing device 204 may include other web services, based upon a particular implementation, but only a single web service is depicted in FIG. 2 and described herein for purposes of explanation. Client device 202 includes a user interface 210, an application program 212, a print driver installation application 214, a print driver 216, with a User Interface (UI) module and a rendering module 220, a port monitor and Web Services Device (WSD) Application Program Interface (API) module 222, a spooler 224 and a storage 226. Storage 226 stores printing device capabilities data 228 (referred to hereinafter as "PDCA 228"), print data 230, and a print job ticket 232. Storage also includes a print driver storage 234 and a registry 236 that stores printer description data 238 and a default print ticket 240. Each of these elements is briefly described below and in more detail hereinafter.

User interface 210 is a mechanism and/or medium for presenting information to a user and allowing user input. Application program 212 may be any type of program that prints data. Examples of application program 212 include, without limitation, a word processing program, a spreadsheet program, an email client, etc. A single application program 212 is depicted in FIG. 2 for purposes of explanation, but client device 202 may have any number of application programs.

Print driver installation application 214 performs installation of print driver 216 which may include installing any data or files required by print driver 216. Installation of print driver 216 may also include obtaining data and/or files from other sources and locations, depending upon an implementation, as well as performing any configuration required by an operating system.

Print driver 216 interacts with application program 212 to generate print data for printing on printing device 204. UI module 218 generates graphical user interface data which, when processed by application program 212, provides a graphical user interface on user interface 210 for a user to select the features and options to be used when printing a particular electronic document. Rendering module 220 processes application data generated by application program 212 and generates print data which, when processed by printing device 204, cause a printed version of an electronic document reflected in the print data to be printed at printing device 204. Print driver 216 performs various other functions that are described in more detail hereinafter.

Port monitor and WSD API module 222 allows communications between print driver 216 and printing device 204. For example, the WSD API module 222 may be installed on a custom port and print driver 216 communicates with the WSD API module 222 via the custom port. The port monitor and WSD API module 222 communicates with printing device 204. Thus, port monitor and WSD API module 222 is capable of converting client side commands, e.g., BiDi function calls, to SOAP requests, in the form of SOAP envelopes, and is also capable of extracting XML information from SOAP responses received from printing device 204, in the form of SOAP envelopes, and generating BiDi function call responses. Port monitor and WSD API module 222 sends SOAP requests to the port associated with Web services-enabled printing service 208.

Printing device capabilities data 228 is data that specifies the current features and options, i.e., allowed values for each feature, of printing device 204. Examples of printing device features include, without limitation, a paper tray, duplex printing, stapling, hole punching, etc. Each feature has one or more options, i.e., values. Some features may only have two options. For example, duplex unit has two options, such as “Installed” or “Not Installed.” Other features, for example, paper size, may have many options, e.g., “A4”, “legal”, “8½×11”, etc. Printing device capabilities data 228 stored on client device 202 may include printing device capability data for any number of Web services-enabled printing devices. As described below, printing device capabilities day 228 may be organized in an XML format.

Print data 230 is data generated by print driver 216, based at least upon application data generated by application program 212. Application data, when processed by printing device 204, causes a printed version of an electronic document represented in the print data 230 to be printed. Print job ticket 232 specifies one or more parameters that indicate how print data 230 is to be processed at printing device 204. Print data 230 may include data for multiple print jobs and print job ticket 232 may include multiple print job tickets.

Print driver storage 234 contains one or more print drivers that are used by client device to print on printing devices. Registry 236 is an area of storage 226 for storing printer description data 238, a default print ticket 240, and a PrintCapabilities Document 242. Registry 236 may be a protected area of storage 226 that is under the control of an operating system on client device 202. Default print ticket 240 includes data that indicates default options for the features supported by printing device 204. Default print ticket 240 is described as a single default print ticket for purposes of explanation, but default print ticket 240 may include default print tickets for any number of printing devices. Likewise, PrintCapabilities Document 242 may include a PrintCapabilities Document for any number of printing devices.

Print driver 216 generates printer description data 238 based at least upon printing device capabilities data 228 and core mapping data, which is described in more detail below. Briefly, core mapping data maps certain data found in printing device capabilities data 228 to other data that is used to generate printer description data 238. Printer description data 238 specifies display data for one or more feature and options currently supported by printing device 204. Print driver 216 may use printer description data 238 to generate graphical user interface data and also for generating print data 230 and/or print job ticket 232.

III. Generating Printer Description Data

As previously described herein, print driver 216 is configured to generate and store, in registry 236, printer description data 238 and is also configured to store default print tickets received from WSD printing device 204. UI module 218 uses printer description data 238 to generate GUI data which, when processed by application program 212, causes a GUI to be displayed on user interface 210 that displays the features and options supported by WSD printing device 204 and allows a user to select one or more features and options to be used when printing a particular electronic document.

The process for generating printer description data 238 generally involves combining information from the printing device capabilities data 228 for WSD printing device 204 and data from Core Mapping Data that is provided as part of the basic installed print driver. Appendix A includes example printing device capabilities data, Appendix B includes example core mapping data, Appendix C includes example printer description data.

According to one embodiment of the invention, UI module 218 examines the printing device capabilities data 228 and identifies the printing device features specified therein. For each feature in printing device capabilities data 228, UI module 218 determines whether the feature is defined in the core mapping data. Core mapping data includes PDLKeywords and rcNameIDs for a standard set of printing device features and options. If a particular feature in printing device capabilities data 228 is defined in the core mapping data, then UI module 218 retrieves a PDLkeyWord value and rcNameID Value for the particular feature and each of the corresponding options from the core mapping file and stores the PDLkeyWord values and the rcNameID Values in printer description data 238. The PDLkeyWord value provides a mapping between a feature or option terminology understood by print driver 216 and the terminology understood by WSD printing service 208 for the same feature or option. The rcNameID Value indicates the name of a string variable (resource ID) that contains the string for the feature or option. The string is included in the GUI data that is generated by UI module 218 and provided to application program 212. Consider the following example. Suppose that printing device capabilities data 228 includes a feature named “InputTray4”. Suppose further that this feature is defined in the core mapping data as indicated below in Table I.

TABLE I

```
<DeviceFeature Value=“InputTray4”>
  <PDLKeyword Value=“InputTray4”/>
  <rcNameID Value=“RC_STR_TRAY4” />
  <FeatureOption Value=“NotInstalled”>
    <PDLKeyword Value=“NotInstalled” />
    <rcNameID Value=“RC_STR_NOTINSTALLED” />
  </FeatureOption >
  <FeatureOption Value=“Installed”>
    <PDLKeyword Value=“Installed” />
    <rcNameID Value=“RC_STR_INSTALLED” />
  </FeatureOption >
</DeviceFeature >
```

As indicated in Table I, the feature InputTray4 has two options that include “NotInstalled” and “Installed”. Note that the feature and each option has both a specified PDLKeyword value and a specified rcNameID value, which UI module 218 retrieves and stores in printer description data.

If the particular feature in printing device capabilities data 228 is not defined in the core mapping file, then the particular feature is typically a new feature. In this situation, UI module 218 uses the feature name for the particular feature from the printing device capabilities data 228 to generate the PDLkeyWord value for printer description data 238. In addition, UI module 218 includes the DisplayName values for the particular feature in printer description data 238. Multiple DisplayName values may be included in printer description data 238 for each feature and/or option to provide support for multiple languages. The display name values are included in the GUI data that is generated by UI module 218 and provided to application program 212. Referring to the prior example, suppose that the feature named “InputTray4” is not defined in the core mapping data. Suppose further that this feature is defined in printing device capabilities data 228 as indicated below in Table II.

TABLE II

```
<rodp:InputTray4>
  <rodp:DisplayName xml:lang=“en-US”>Tray 4</rodp:DisplayName>
  <rodp:DefaultOption>NotInstalled</rodp:DefaultOption>
  <rodp:InputTray4Entry Name=“NotInstalled”>
    <rodp:DisplayName xml:lang=“en-US”>Not
```

TABLE II-continued

```
    Installed</rodp:DisplayName>
  </rodp:InputTray4Entry>
  <rodp:InputTray4Entry Name="Installed">
    <rodp:DisplayName xml:lang="en-
    US">Installed</rodp:DisplayName>
  </rodp:InputTray4Entry>
</rodp:InputTray4>
```

As indicated in TABLE II, there are no PDLKeyword values or rcNameID values contained in the definition of the InputTray4 feature in printing device capabilities data 228. In this example, the feature name "InputTray4" is stored in printer description data 238 as the PDLKeyword value. Also, UI module 218 retrieves the DisplayName values for the feature and each option and stores the DisplayName values in printer description data 238.

IV. Print Capabilities Document

PrintCapabilities Document 242 contains the features and options that are specific to a single printer model. When application program 212 calls API functions for PrintCapabilities Document 242, printer driver 216 may at point generate PrintCapabilities Document 242 based on a current set of device feature and options defined in printer description data 238.

In an embodiment, both data (a) and (b) is dynamic and extendable with respect to device features. For example, any device features that are added to printing device 204 can also be added to PrintCapabilities Document 242. As another example, if a device feature that is indicated in PrintCapabilities Document 242 and subsequently becomes unavailable on printing device 204, then PrintCapabilities Document 242 is updated to indicate that that device feature is unavailable, e.g., by deleting that device feature from PrintCapabilities Document 242.

In an embodiment, PrintCapabilities Document 242 is generated based at least upon printer description data 238 and mapping data. For example, PSP module 219 examines the printer description data 238 to identify a device feature. Then PSP module 219 uses the mapping data to map the device feature to a set of one or more tags with an appropriate feature name (e.g., supported by Microsoft). If the device feature is not identified in the mapping data, then PSP module 219 creates one or more custom tags. Appendix D includes an example PrintCapabilities Document. In the event of any changes to printing device 204 (e.g., adding or removing the optional features), print driver 216 is triggered to update printer description data 238. It is beneficial to rely on printer description data 238 as a single point of source for multiple actions, such as updating the UI or updating PrintCapabilities Document 242.

One difference between the use of printer description data 238 and PrintCabilities Document 242 is that printer description data 238 is used by UI module 218 to generate a user interface. Printer description data 238 is internal to print driver 216 and is not exported to external applications, such as application program 212. UI module 218 may be the one that creates PrintCapabilities Document 242 from printer description data 238 and may send PrintCapabilities Document 242 to application program 212. Application program 212 uses PrintCapabilities Document 242 to create a user interface or perform some manipulation with PrintCapabilities Document 242, such as creating a PrintTicket Document. Application program 212 might also use PrintCapabilities Document 242 for document conversion, printing automation, and print job optimization.

Querying a PrintCapabilities Document for printing automation is widely used by manufacturers and retailers. Some companies have a large variety of printers for different print purposes. For example, WalMart has a large printing department for printing bar code labels, invoices, coupons, etc. WalMart supports many types of printers located throughout the world. Each type of printer may have a different set of print attributes. For example, a bar code printer may have print-on labels, use cutters and ribbons, and print at a relatively high speed. An invoice printer may use many types of inks and require special paper. A coupon printer may have a wide variety of printing characteristics, such as random paper size, any media type, having high resolution or having low resolution, and requiring color printing or not requiring color printing.

Such retailers tend to have special middleware developers who develop applications for printing automation. Such applications query each printer's PrintCapabilities Document and status, automatically pull data from a database and create print jobs periodically, locate printers worldwide that are best suited for print jobs, and adjust the printer and print jobs according to job size, printing purpose, color, resolution, paper size, media type, etc.

Some printing shops have a variety of printers for different customer purposes. For example, some printers have a wide dimension and some have large input bin size for supporting a large amount of paper without changing input bins. Applications can query these printer attributes and capabilities and automatically assign print jobs to printers that are best suited for the print jobs.

FIGS. 3A-B are diagrams that depict an example of a portion of printing device capabilities data 310, printer description data 320, PrintCapabilities Document 330, and a PrintTicket Document 340, according to an embodiment of the invention. In this example, printing device capabilities data 310 (in FIG. 3A) comprises data that indicates a device feature that indicates that a printing device supports the printing of print data on a single side of a print medium (such as paper) or one two sides of a print medium. Printer description data 320 (in FIG. 3A) is generated in part upon, and corresponds, to printing device capabilities data 310.

PrintCapabilities Document 330 (in FIG. 3B) is generated based in part upon, and corresponds to, printer description data 320. The "psf" tag in PrintCapabilities Document 330 is an acronym for Print Schema Framework. The Print Schema Framework defines the elements that can be used in a PrintCapabilities Document. The "psk" tag in PrintCapabilities Document 330 is an acronym for Print Schema Keyword. Print Schema Keywords define commonly-used element hierarchies, or keywords, for the purpose of promoting portability of the information and intent between individual clients. However, Print Schema Keywords also allow private extensions so that a PrintCapabilities Document can be tailored to meet specific needs. If a device feature in printer description data 330 is not identified in the mapping data, then a custom tag is used, such as "ihv" rather than "psf," to indicate a device feature.

PrintTicket Document 340 (in FIG. 3B) is generated based in part upon, and corresponds to, PrintCapabilities Document 330. In this example, a user selected the one-sided printing option, rather than one of the two two-sided printing options.

Figure 4:
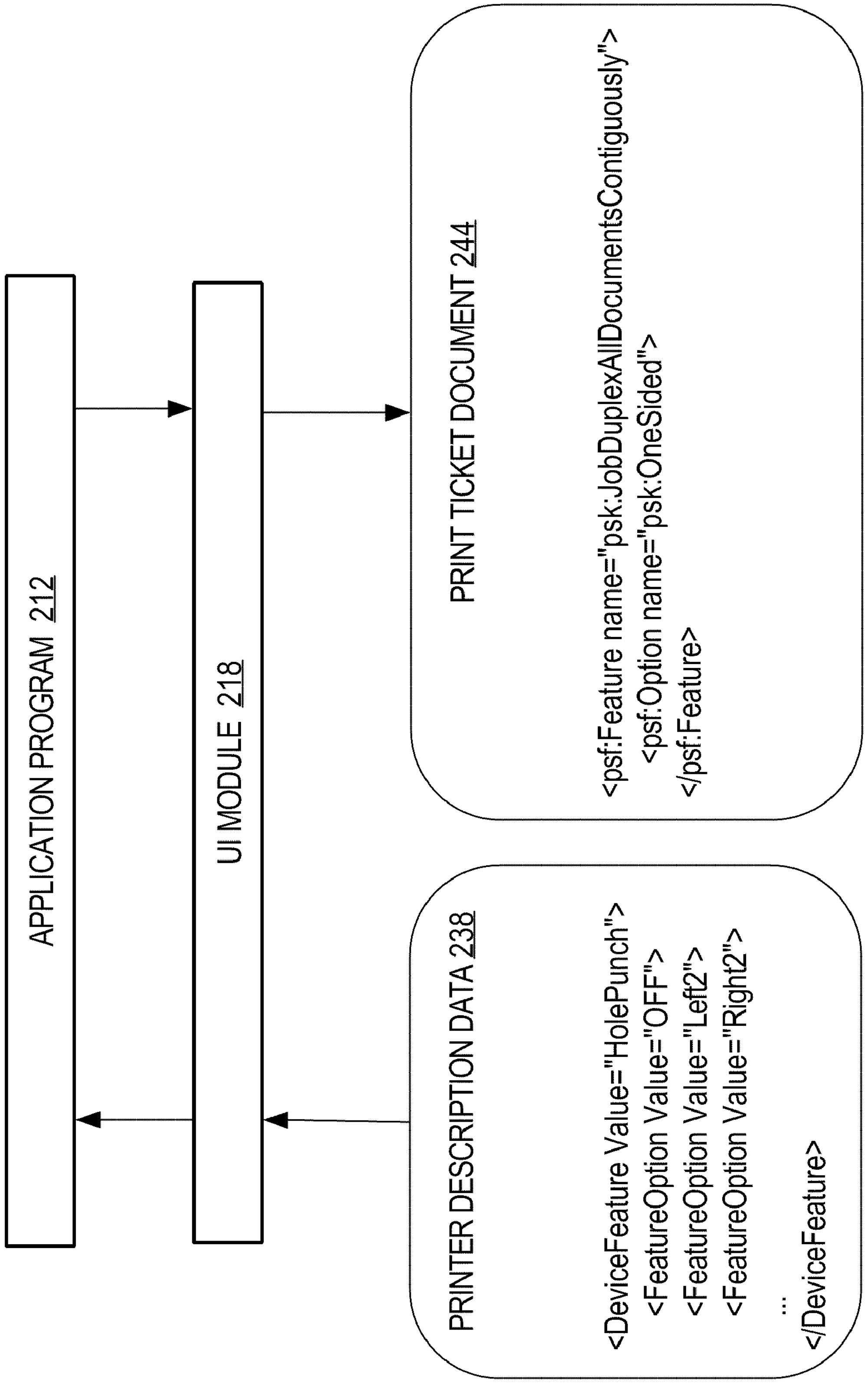
FIG. 4 is a block diagram that depicts a relationship between printer description data and a PrintCapabilities Document, according to an embodiment of the invention.

FIG. 4 is a block diagram that depicts a relationship between printer description data 238 and PrintTicket Document 244, according to an embodiment of the invention.

PrintCapabilities Document 242 is generated based at least upon printing device capabilities data 228 or printer description data 238 from printing device 204. As depicted in FIG. 4, printer description data 238 includes a new device feature entitled "HolePunch" that is not defined in either portion 310 or portion 320. This new device feature includes at least three options: "OFF," "Left2," and "Right2." The "Left2" and "Right2" options indicate the number and locations of holes. After a user (or default) selection, a modified PrintCapabilities Document 242 indicates that the value selected for the new device feature "HolePunch" is "OFF."

FIG. 4 depicts one of two approaches for generating a PrintTicket Document 244. In a first approach (as described above), UI module 218 generates, based on printer description data 238, graphical user interface data which, when processed by application program 212, provides a graphical user interface on user interface 210 for a user to select the features and options to be used when printing an electronic document. Application program 212 saves the user's (and any default) selections as a PrintTicket Document.

In a second approach (not depicted in FIG. 4), application program 212 accesses PrintCapabilities Document 242 in order to generate a GUI on user interface 210 to present to the requesting user. Application program 212 may access PrintCapabilities Document 242 directly or indirectly by requesting PrintCapabilities Document 242 from print driver 216. Application program 212 stores the user (and/or default) selections into a PrintTicket Document. Application program 212 passes the print ticket to print driver 216 for further processing.

Generating a UI based on an updated PrintCapabilities Document 242 is one of many possible ways in which an updated PrintCapabilities Document 242 may be used. For example, an update of PrintCapabilities Document 242 may cause application 212 to perform a certain action.

V. Updating Print Capabilities Document

Figure 5:
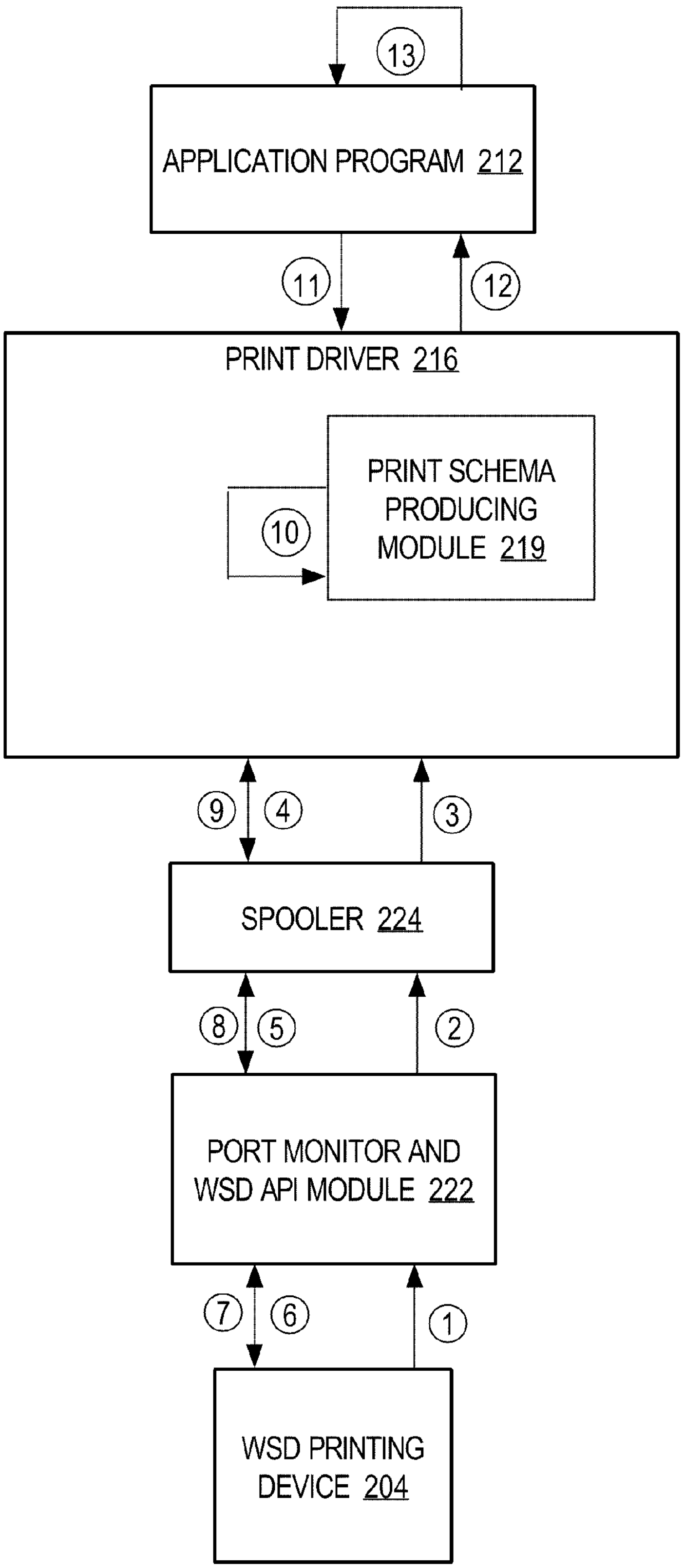
FIG. 5 is a block diagram that depicts how a PrintCapabilities Document is updated, according to an embodiment of the invention.

FIG. 5 is a block diagram that depicts updating a PrintCapabilities Document, according to an embodiment of the invention. In Step 1, printing device 204 generates an event indicating a change in printing features or options. This may include the deletion, addition, or change of a printing feature or option. Port monitor and WSD API module 222 has subscribed to receive this event and receives the event. For example, port monitor and WSD API module 222 may receive an event notification in the form of a SOAP message specifying the event.

In Step 2, port monitor and WSD API module 222 receives the event notification and notifies spooler 224. In Step 3, spooler 224 notifies print driver 216. In Step 4, print driver 216 sends (via spooler 224 in step 5) to the port monitor and WSD API module 222 a request for the device capabilities of printing device 204. The request may be implemented, for example, by a call to a SendRecvBiDiData function that contains a request for the device capabilities data of printing device 204. In this situation, the SendRecvBiDiData function makes a call to port monitor and WSD API module 222.

In Step 6, port monitor and WSD API module 222 generates a SOAP request, in the form of a SOAP envelope, based at least upon the request received from print driver 216, and forwards the SOAP request to printing device 204.

In Step 7, printing device 204 generates and sends to port monitor and WSD API module 222 a SOAP response (in the form of a SOAP envelope) that includes the device capabilities data for printing device 204. The device capabilities data for printing device 204 specifies the features and options currently supported by printing device 204. The device capabilities data in the SOAP response may include any portion or all of the device capabilities data available on printing device 204, depending upon a particular implementation. For example, the device capabilities data retrieved in response to the event notification may include all of the device capabilities data available on printing device 204. Alternatively, only the device capabilities data that corresponds to the change in features or options may be retrieved from printing device 204. In addition, the device capability data may be retrieved using any number of SOAP requests and responses. The SOAP response may also include a default print ticket that specifies default options for printing device 204.

In Step 8, port monitor and WSD API module 222 sends, to print driver 216 (via spooler 224 in step 9), a response that contains the device capabilities data of printing device 204. This may include port monitor and WSD API module 222 extracting XML information from the SOAP response and generating a response that includes the extracted information. In the situation where the request was implemented using a call to SendRecvBiDiData function, the response to the function call contains the device capabilities data from printing device 204.

In Step 10, Print Schema producing (PSP) module 219 generates PrintCapabilities Document 242 as previously described herein. PSP module 219 also stores PrintCapabilities Document 242 in registry 236 as previously described herein. Alternatively, PSP module 219 may update the existing PrintCapabilities Document 242 to reflect the change in the feature(s) and/or options supported by printing device 204.

In Step 11, application program 212 makes a request to print driver 216 for PrintCapabilities Document 242. In Step 12, print driver 216 retrieves PrintCapabilities Document 242 from registry 236 and sends PrintCapabilities Document 242 to application program 212. Application program 212 generates a GUI, on user interface 210, to allow a user to view the features and options supported by printing device 204. In step 13, application program 212 generates a PrintTicket Document based on the user's (and/or any default) selections and sends print data and the PrintTicket Document to print driver 216. Print driver 216 generates a print job ticket based on the PrintTicket Document.

Alternatively, with respect to Steps 11-13, application program 212 requests print driver 216 to generate a GUI. In response, UI module 218 generates a GUI based on PrintCapabilities Document 242. A user selects one or more feature options displayed on the GUI. UI module 218 saves the user (and any default) selections into a PrintTicket Document. Print driver 216 then generates a print job ticket based on the PrintTicket Document.

Figure 6:
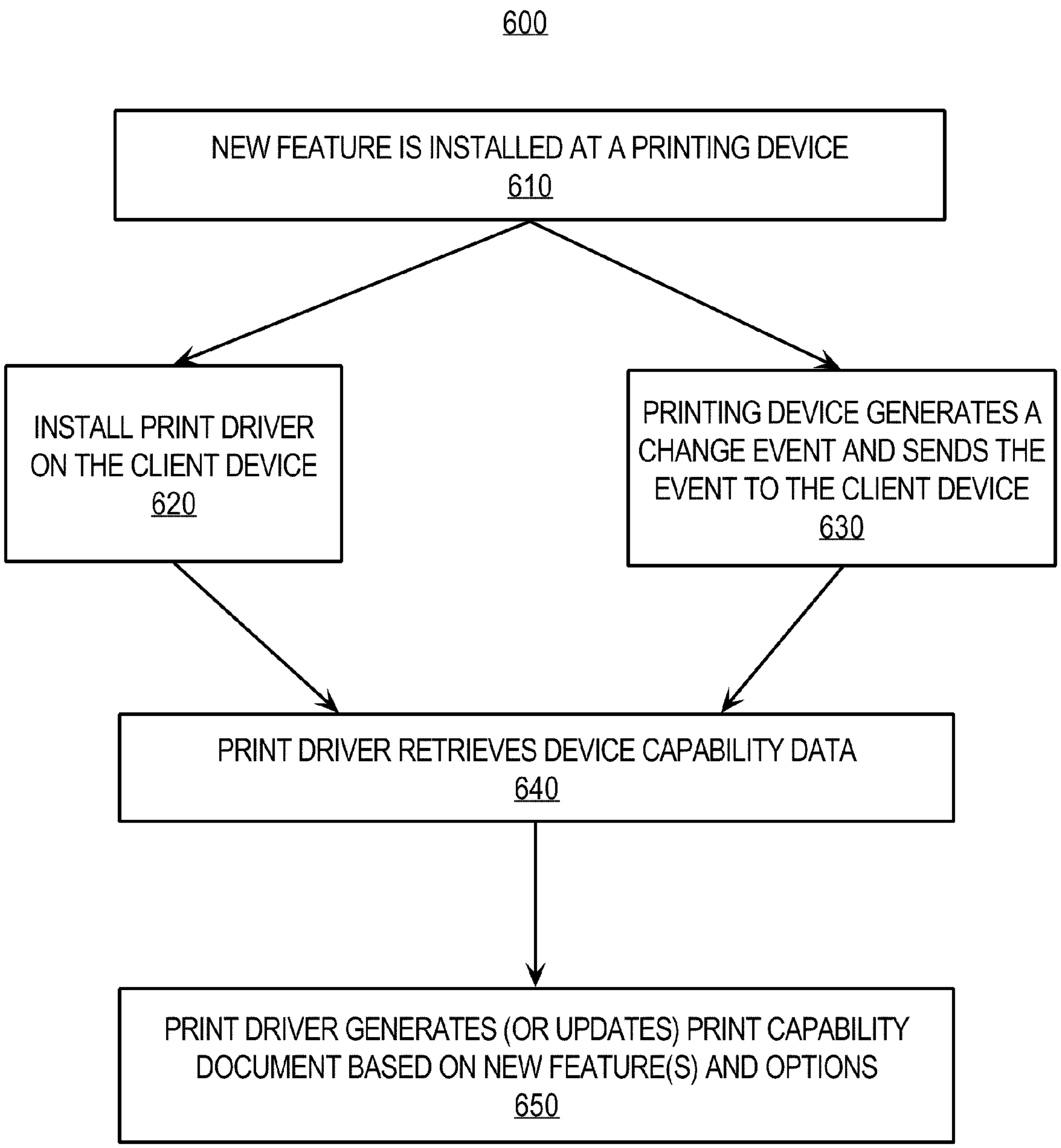
FIG. 6 is a flow diagram that depicts at least two scenarios in which a PrintCapabilities Document is generated or updated, according to an embodiment of the invention.

FIG. 6 is a flow diagram that depicts at least two scenarios in which PrintCapabilities Document 242 is generated or updated, according to an embodiment of the invention. In step 610, a new feature is installed at (or otherwise added to) printing device 204. For example, a new hole punch feature with numerous options is installed on printing device 204. The process proceeds either to step 620 or step 630, depending on whether a print driver is installed at client device 202 for printing device 204.

If a print driver is not installed on client device 202, then, in step 620, print driver 216 is installed on client device 202. In a scenario where a print driver (e.g., print driver 216) is already installed on client device 202, printing device 204 generates, in step 630, a device feature change event and sends the event to client device 202. The process proceeds from either of steps 620 or 630 to step 640. In step 640, print driver 216 retrieves printing device capabilities data 228 from printing device 204. In step 650, print driver 216 (or PSP module 219) generates or updates PrintCapabilities Document 242 based at least upon at least a portion of the set of features and options indicated in printing device capabilities data 228. Therefore, print driver 216 generates a current version of PrintCapabilities Document 242 either in response to the print driver being installed or in response to a device feature change event.

Figure 7:
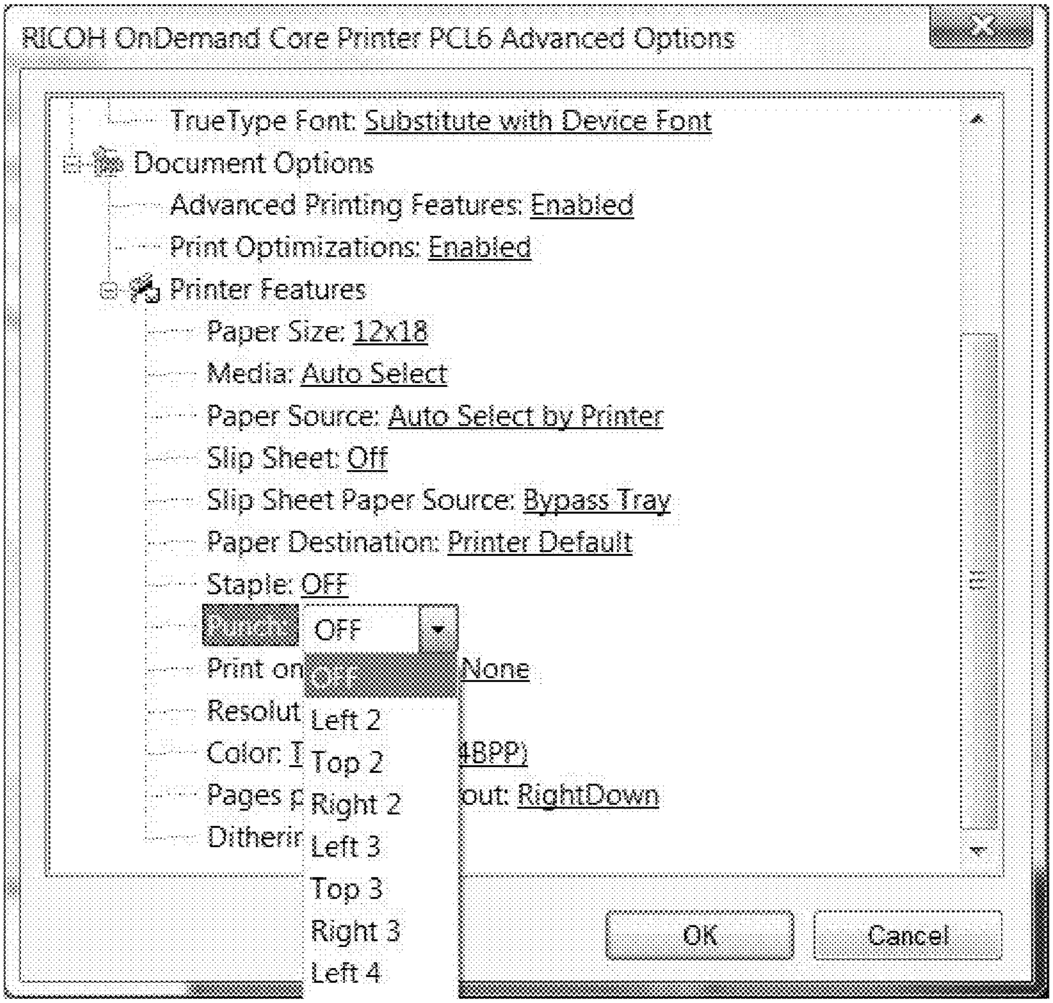
FIG. 7 is a block diagram that depicts a user interface based on a new device feature, according to an embodiment of the invention.

FIG. 7 is a block diagram that depicts a user interface 700 based on a new device feature, according to an embodiment of the invention. Each device feature is typically associated with a plurality of options, one of which is selected for the feature for a print job. In this example, the new device feature is "HolePunch," which is depicted in UI 700 as "Punch." The various options associated with this new device feature are "OFF," "Left 2," "Top 2," "Right 2," "Left 3," "Top 3," "Right 3," and "Left 4."

Figure 8:
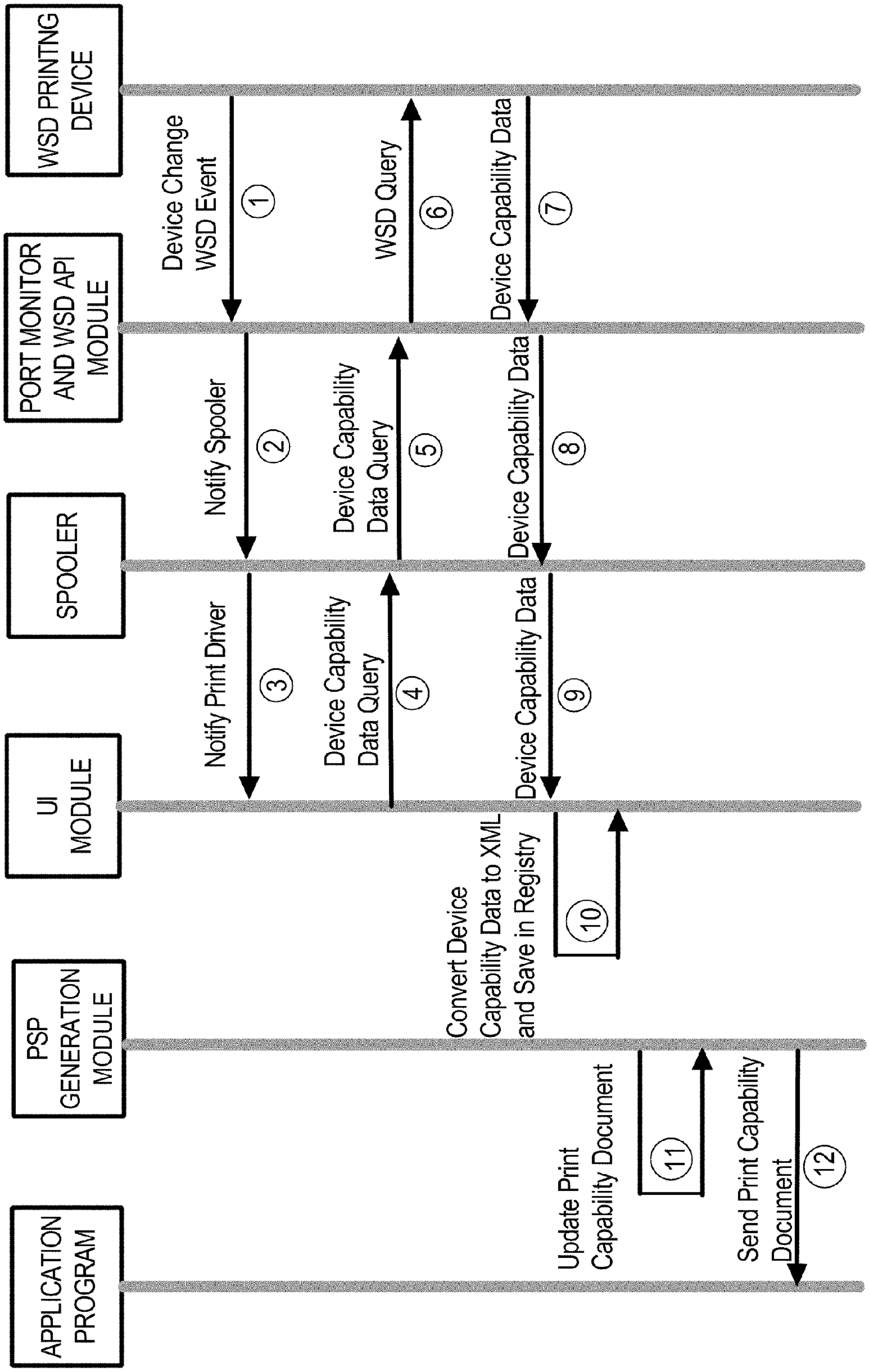
FIG. 8 is a sequence diagram that depicts a process for updating a PrintCapabilities Document based on a new device feature and corresponding options, according to an embodiment of the invention.

FIG. 8 is a sequence diagram that depicts a process for updating PrintCapabilities Document 242 based on a new device feature and corresponding options, according to an embodiment of the invention. In Step 1, printing device 204 generates an event indicating a change in printing features or options. This may include the deletion, addition, or change of a printing feature or option. Port monitor and WSD API module 222 has subscribed to receive this event and receives the event. For example, port monitor and WSD API module 222 may receive an event notification in the form of a SOAP message specifying the event.

In Step 2, port monitor and WSD API module 222 receives the event notification and notifies spooler 224. In Step 3, spooler 224 notifies UI module 218. In Step 4, UI module 218 sends, to port monitor and WSD API module 222 (via spooler 224 in Step 5), a request for the device capabilities of printing device 204. The request may be implemented, for example, by a call to a SendRecvBiDiData function that contains a request for the device capabilities data of printing device 204. In this situation, the SendRecvBiDiData function makes a call to port monitor and WSD API module 222.

In Step 6, port monitor and WSD API module 222 generates a SOAP request, in the form of a SOAP envelope, based at least upon the request received from UI module 218, and forwards the SOAP request to printing device 204.

In Step 7, printing device 204 generates and sends to port monitor and WSD API module 222 a SOAP response (in the form of a SOAP envelope) that includes the device capabilities data for printing device 204. The device capabilities data for printing device 204 specifies one or more features and options currently supported by printing device 204. The device capabilities data in the SOAP response may include any portion or all of the device capabilities data available on printing device 204, depending upon a particular implementation. For example, the device capabilities data retrieved in response to the event notification may include all of the device capabilities data available on printing device 204. Alternatively, only the device capabilities data that corresponds to the change in features or options may be retrieved from printing device 204. In addition, the device capability data may be retrieved using any number of SOAP requests and responses.

In Step 8, port monitor and WSD API module 222 sends, to UI module 218 (via spooler 224 in Step 9), a response that contains the device capabilities data of printing device 204. This may include port monitor and WSD API module 222 extracting XML information from the SOAP response and generating a response that includes the extracted information. In the situation where the request was implemented using a call to SendRecvBiDiData function, the response to the function call contains the device capabilities data from printing device 204.

In Step 10, UI module 218 generates printer description data 238 for printing device 204 and stores printer description data 238 in registry 236 as previously described herein. Alternatively, UI module 218 may update the existing printer description data for printing device 204 to reflect the change in the features and/or options made to printing device 204.

In Step 11, PSP module 219 generates a new PrintCapabilities Document 242 (or updates an existing PrintCapabilities Document based at least upon the new, deleted, or changed feature).

In Step 12, application program 212 requests PrintCapabilities Document 242 from print driver 216 and generates a user interface based on the new (or updated) PrintCapabilities Document 242.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
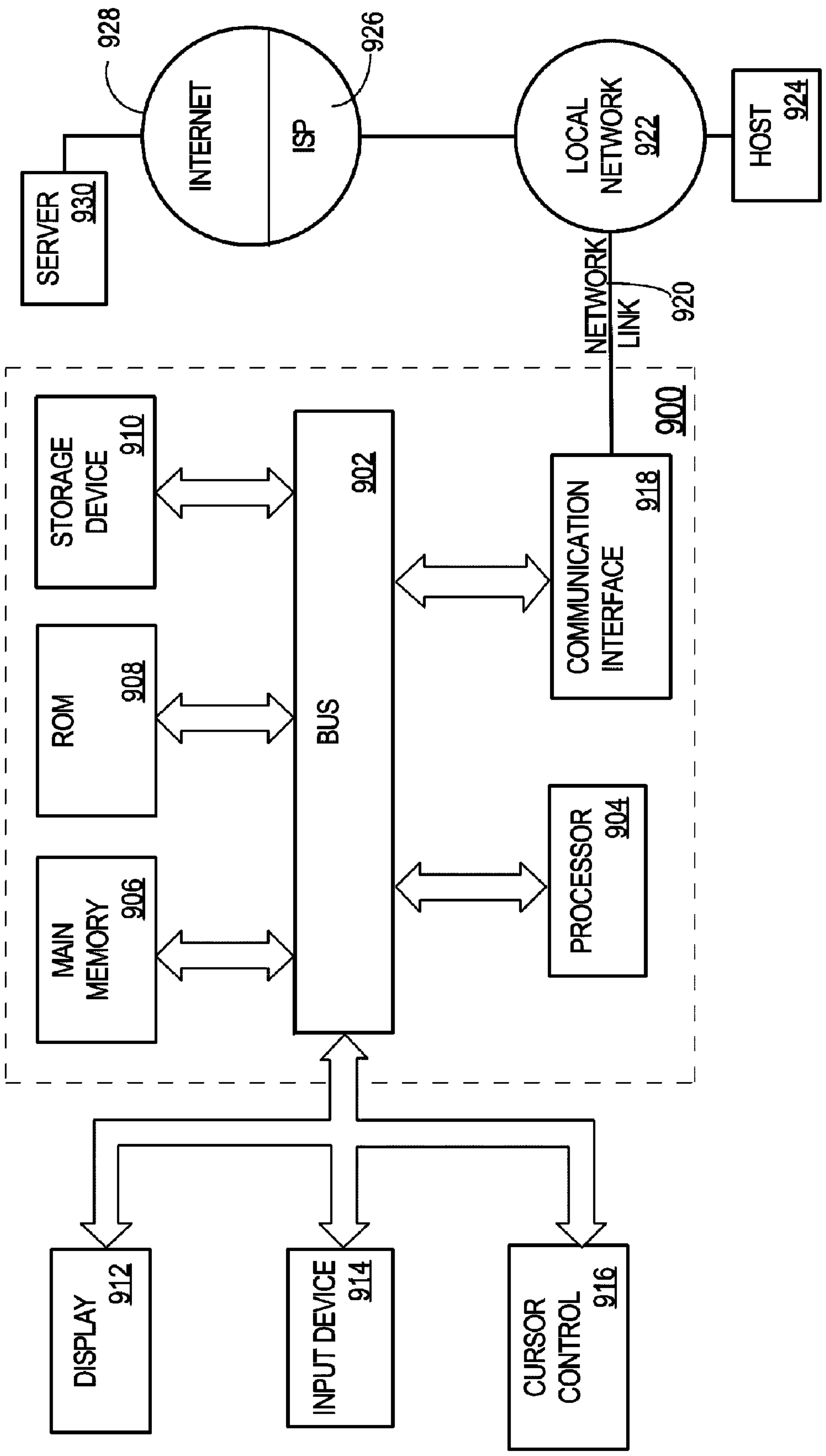
FIG. 9 is a block diagram that depicts a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

VIII. Appendix A

Example Device Capabilities Data

```
<?xml version="1.0" ?>
 <RequestedPrinterElements
 xmlns:wprt="http://schemas.microsoft.com/windows/2006/08/wdp/print"
 xmlns:rodp="http://schemas.Ricoh-Usa.com/wsd/print">
  <wprt:PrinterCapabilities>
   <wprt:JobValues>
```

-continued

```
    <wprt:JobProcessing>
      <wprt:Copies>
        <wprt:MinValue>1</wprt:MinValue>
        <wprt:MaxValue>999999</wprt:MaxValue>
      </wprt:Copies>
      <wprt:JobFinishings>
        <wprt:Staple>
          <wprt:Localtion>
            <wprt:AllowedValue>unknown</wprt:AllowedValue>
          </wprt:Localtion>
          <wprt:Angle>
            <wprt:AllowedValue>unknown</wprt:AllowedValue>
          </wprt:Angle>
        </wprt:Staple>
        <wprt:HolePunch>
          <wprt:Edge>
            <wprt:AllowedValue>Left</wprt:AllowedValue>
          </wprt:Edge>
          <wprt:Pattern>
            <wprt:AllowedValue>unknown</wprt:AllowedValue>
          </wprt:Pattern>
        </wprt:HolePunch>
      </wprt:JobFinishings>
      <wprt:Priority>
        <wprt:MinValue>50</wprt:MinValue>
        <wprt:MaxValue>50</wprt:MaxValue>
      </wprt:Priority>
    </wprt:JobProcessing>
    <wprt:DocumentProcessing>
      <wprt:MediaSizeName>
        <wprt:AllowedValue>Letter</wprt:AllowedValue>
        <wprt:AllowedValue>iso_A4</wprt:AllowedValue>
      </wprt:MediaSizeName>
      <wprt:MediaType>
        <wprt:AllowedValue>unknown</wprt:AllowedValue>
      </wprt:MediaType>
      <wprt:MediaColor>
        <wprt:AllowedValue>unknown</wprt:AllowedValue>
      </wprt:MediaColor>
      <wprt:NumberUp>
    <wprt:PagesPerSheet>
      <wprt:AllowedValue>1</wprt:AllowedValue>
      <wprt:AllowedValue>2</wprt:AllowedValue>
      <wprt:AllowedValue>4</wprt:AllowedValue>
      <wprt:AllowedValue>9</wprt:AllowedValue>
      <wprt:AllowedValue>16</wprt:AllowedValue>
    </wprt:PagesPerSheet>
    <wprt:Direction>
      <wprt:AllowedValue>RightDown</wprt:AllowedValue>
      <wprt:AllowedValue>DownRight</wprt:AllowedValue>
      <wprt:AllowedValue>LeftDown</wprt:AllowedValue>
      <wprt:AllowedValue>DownLeft</wprt:AllowedValue>
    </wprt:Direction>
  </wprt:NumberUp>
  <wprt:Orientation>
    <wprt:AllowedValue>Landscape</wprt:AllowedValue>
    <wprt:AllowedValue>Portrait</wprt:AllowedValue>
    <wprt:AllowedValue>ReverseLandscape</wprt:AllowedValue>
    <wprt:AllowedValue>ReversePortrait</wprt:AllowedValue>
  </wprt:Orientation>
  <wprt:Resolution>
    <wprt:AllowedValue>
      <wprt:Width>600</wprt:Width>
      <wprt:Height>600</wprt:Height>
    </wprt:AllowedValue>
  </wprt:Resolution>
  <wprt:PrintQuality>
    <wprt:AllowedValue>Normal</wprt:AllowedValue>
  </wprt:PrintQuality>
  <wprt:Sides>
    <wprt:AllowedValue>OneSided</wprt:AllowedValue>
    <wprt:AllowedValue>TwoSidedLongEdge</wprt:AllowedValue>
    <wprt:AllowedValue>TwoSidedShortEdge</wprt:AllowedValue>
  </wprt:Sides>
</wprt:DocumentProcessing>
</wprt:JobValues>
<wprt:DocumentValues>
  <wprt:DocumentDescription>
    <wprt:Compression>
      <wprt:AllowedValue>None</wprt:AllowedValue>
```

-continued

```
   </wprt:Compression>
   <wprt:Format>
    <wprt:AllowedValue>application/octet-stream</wprt:AllowedValue>
    <wprt:AllowedValue>unknown</wprt:AllowedValue>
   </wprt:Format>
  </wprt:DocumentDescription>
 </wprt:DocumentValues>
 <rodp:RicohPrinterCapabilities>
   <rodp:JobValues>
    <rodp:JobProcessing>
     <rodp:JobFinishings>
      <rodp:HolePunch>
       <rodp:DisplayName xml:lang="en-US">Punch</rodp:DisplayName>
       <rodp:DisplayName xml:lang="ja-JP">パンチ</rodp:DisplayName>
       <rodp:AllowedValue>
        <rodp:Option>OFF</rodp:Option>
        <rodp:DisplayName xml:lang="en-US">OFF</rodp:DisplayName>
        <rodp:DisplayName xml:lang="ja-JP">オフ</rodp:DisplayName>
       </rodp:AllowedValue>
       <rodp:AllowedValue>
        <rodp:Option>Left2</rodp:Option>
        <rodp:DisplayName xml:lang="en-US">Left 2</rodp:DisplayName>
        <rodp:DisplayName xml:lang="ja-JP">左2か所</rodp:DisplayName>
       </rodp:AllowedValue>
       <rodp:AllowedValue>
        <rodp:Option>Top2</rodp:Option>
        <rodp:DisplayName xml:lang="en-US">Top 2</rodp:DisplayName>
        <rodp:DisplayName xml:lang="ja-JP">上2か所</rodp:DisplayName>
       </rodp:AllowedValue>
       <rodp:AllowedValue>
        <rodp:Option>Right2</rodp:Option>
        <rodp:DisplayName xml:lang="en-US">Right 2</rodp:DisplayName>
        <rodp:DisplayName xml:lang="ja-JP">右2か所</rodp:DisplayName>
       </rodp:AllowedValue>
       <rodp:AllowedValue>
        <rodp:Option>Left3</rodp:Option>
        <rodp:DisplayName xml:lang="en-US">Left 3</rodp:DisplayName>
        <rodp:DisplayName xml:lang="ja-JP">左3か所</rodp:DisplayName>
       </rodp:AllowedValue>
       <rodp:AllowedValue>
        <rodp:Option>Top3</rodp:Option>
        <rodp:DisplayName xml:lang="en-US">Top 3</rodp:DisplayName>
        <rodp:DisplayName xml:lang="ja-JP">上3か所</rodp:DisplayName>
       </rodp:AllowedValue>
       <rodp:AllowedValue>
        <rodp:Option>Right3</rodp:Option>
        <rodp:DisplayName xml:lang="en-US">Right 3</rodp:DisplayName>
        <rodp:DisplayName xml:lang="ja-JP">右3か所</rodp:DisplayName>
       </rodp:AllowedValue>
       <rodp:AllowedValue>
        <rodp:Option>Left4</rodp:Option>
        <rodp:DisplayName xml:lang="en-US">Left 4</rodp:DisplayName>
        <rodp:DisplayName xml:lang="ja-JP">左4か所</rodp:DisplayName>
       </rodp:AllowedValue>
       <rodp:AllowedValue>
        <rodp:Option>Top4</rodp:Option>
        <rodp:DisplayName xml:lang="en-US">Top 4</rodp:DisplayName>
        <rodp:DisplayName xml:lang="ja-JP">上4か所</rodp:DisplayName>
       </rodp:AllowedValue>
       <rodp:AllowedValue>
        <rodp:Option>Right4</rodp:Option>
        <rodp:DisplayName xml:lang="en-US">Right 4</rodp:DisplayName>
        <rodp:DisplayName xml:lang="ja-JP">右4か所</rodp:DisplayName>
       </rodp:AllowedValue>
      </rodp:HolePunch>
     </rodp:JobFinishings>
    </rodp:JobProcessing>
    <rodp:DocumentProcessing>
     <rodp:Sides>
      <rodp:DisplayName xml:lang="en-US">Print on Both Sides</rodp:DisplayName>
      <rodp:DisplayName xml:lang="ja-JP">両面印刷</rodp:DisplayName>
      <rodp:AllowedValue>
       <rodp:Option>OneSided</rodp:Option>
       <rodp:DisplayName xml:lang="en-US">None</rodp:DisplayName>
       <rodp:DisplayName xml:lang="ja-JP">なし</rodp:DisplayName>
      </rodp:AllowedValue>
      <rodp:AllowedValue>
       <rodp:Option>TwoSidedLongEdge</rodp:Option>
```

-continued

```
        <rodp:DisplayName xml:lang="en-US">Flip on long edge</rodp:DisplayName>
        <rodp:DisplayName xml:lang="ja-JP">長辺を綴じる</rodp:DisplayName>
       </rodp:AllowedValue>
       <rodp:AllowedValue>
        <rodp:Option>TwoSidedShortEdge</rodp:Option>
        <rodp:DisplayName xml:lang="en-US">Flip on short edge</rodp:DisplayName>
        <rodp:DisplayName xml:lang="ja-JP">短辺を綴じる</rodp:DisplayName>
       </rodp:AllowedValue>
      </rodp:Sides>
     </rodp:DocumentProcessing>
     <rodp:RicohPrinterSettings />
    </rodp:JobValues>
   </rodp:RicohPrinterCapabilities>
 </wprt:PrinterCapabilities>
 <wprt:DefaultPrintTicket>
   <wprt:JobDescription>
    <wprt:JobName>DefaultJob</wprt:JobName>
    <wprt:JobOriginatingUserName>DefaultUser</wprt:JobOriginatingUserName>
   </wprt:JobDescription>
   <wprt:JobProcessing>
    <wprt:Copies>1</wprt:Copies>
    <wprt:JobFinishings>
     <wprt:Collate>false</wprt:Collate>
     <wprt:JogOffset>false</wprt:JogOffset>
     <wprt:Staple>
      <wprt:Location>unknown</wprt:Location>
      <wprt:Angle>unknown</wprt:Angle>
     </wprt:Staple>
     <wprt:HolePunch>
     <wprt:Edge>Left</wprt:Edge>
     <wprt:Pattern>unknown</wprt:Pattern>
     </wprt:HolePunch>
    </wprt:JobFinishings>
    <wprt:Priority>50</wprt:Priority>
   </wprt:JobProcessing>
   <wprt:DocumentProcessing>
    <wprt:MediaSizeName>na_letter_8.5x11in</wprt:MediaSizeName>
    <wprt:MediaType>Auto</wprt:MediaType>
    <wprt:MediaColor>unknown</wprt:MediaColor>
    <wprt:NumberUp>
     <wprt:PagesPerSheet>1</wprt:PagesPerSheet>
     <wprt:Direction>RightDown</wprt:Direction>
    </wprt:NumberUp>
    <wprt:Orientation>Portrait</wprt:Orientation>
    <wprt:Resolution>
     <wprt:Width>600</wprt:Width>
     <wprt:Height>600</wprt:Height>
    </wprt:Resolution>
    <wprt:PrintQuality>Normal</wprt:PrintQuality>
    <wprt:Sides>OneSided</wprt:Sides>
   </wprt:DocumentProcessing>
   <rodp:RicohDefaultPrintTicket>
    <rodp:JobProcessing>
     <rodp:JobFinishings>
      <rodp:HolePunch>OFF</rodp:HolePunch>
     </rodp:JobFinishings>
    </rodp:JobProcessing>
    <rodp:DocumentProcessing>
     <rodp:Sides>OneSided</rodp:Sides>
    </rodp:DocumentProcessing>
    <rodp:RicohPrinterSettings />
    </rodp:RicohDefaultPrintTicket>
   </wprt:DefaultPrintTicket>
 </RequestedPrinterElements>
```

IX. Appendix B

Example Core Mapping Data

```
<mapfile>
  <DeviceFeature Value="HolePunch">
    <PDLKeyword Value="Punching" />
    <rcNameID Value="RC_STR_PUNCH" />
    <FeatureOption Value="OFF">
      <PDLKeyword Value="OFF" />
      <rcNameID Value="OFF_DISPLAY" />
```

-continued

```
    </FeatureOption>
    <FeatureOption Value="Left2">
      <PDLKeyword Value="Left2" />
      <rcNameID Value="RC_STR_LEFT2" />
    </FeatureOption>
    <FeatureOption Value="Top2">
      <PDLKeyword Value="Top2" />
      <rcNameID Value="RC_STR_TOP2" />
    </FeatureOption>
    <FeatureOption Value="Right2">
```

-continued

```
    <PDLKeyword Value=“Right2” />
    <rcNameID Value=“RC_STR_RIGHT2” />
  </FeatureOption>
  <FeatureOption Value=“Left3”>
    <PDLKeyword Value=“Left3” />
    <rcNameID Value=“RC_STR_LEFT3” />
  </FeatureOption>
  <FeatureOption Value=“Top3”>
    <PDLKeyword Value=“Top3” />
    <rcNameID Value=“RC_STR_TOP3” />
  </FeatureOption>
  <FeatureOption Value=“Right3”>
    <PDLKeyword Value=“Right3” />
    <rcNameID Value=“RC_STR_RIGHT3” />
  </FeatureOption>
  <FeatureOption Value=“Left4”>
    <PDLKeyword Value=“Left4” />
    <rcNameID Value=“RC_STR_LEFT4” />
  </FeatureOption>
  <FeatureOption Value=“Top4”>
    <PDLKeyword Value=“Top4” />
    <rcNameID Value=“RC_STR_TOP4” />
  </FeatureOption>
  <FeatureOption Value=“Right4”>
    <PDLKeyword Value=“Right4” />
    <rcNameID Value=“RC_STR_RIGHT4” />
```

-continued

```
      </FeatureOption>
    </DeviceFeature>
    <DeviceFeature Value=“Sides”>
      <PDLKeyword Value=“Duplex” />
      <rcNameID Value=“TWO_SIDED_PRINTING_DISPLAY” />
      <FeatureOption Value=“OneSided”>
        <PDLKeyword Value=“NONE” />
        <rcNameID Value=“NONE_DISPLAY” />
      </FeatureOption>
      <FeatureOption Value=“TwoSidedLongEdge”>
        <PDLKeyword Value=“VERTICAL” />
        <rcNameID Value=“FLIP_ON_LONG_EDGE_DISPLAY” />
      </FeatureOption>
      <FeatureOption Value=“TwoSidedShortEdge”>
        <PDLKeyword Value=“HORIZONTAL” />
        <rcNameID Value=“FLIP_ON_SHORT_EDGE_DISPLAY” />
      </FeatureOption>
    </DeviceFeature>
</mapfile>
```

X. Appendix C

Example Printer Description Data

```
<PrinterDescriptionData Device=“RICOH Aficio SP 8200DN” PrinterPagePerMinute=“50”
PrinterPagePerMinuteColor=“0”>
  <DeviceFeatures>
    <DeviceFeature Value=“HolePunch”>
      <PDLKeyword Value=“Punching” />
      <rcNameID Value=“RC_STR_PUNCH” />
      <DefaultOption>OFF</DefaultOption>
      <DisplayName xml:lang=“en-US”>Punch</DisplayName>
      <DisplayName xml:lang=“ja-JP”>パンチ</DisplayName>
      <FeatureOption Value=“OFF”>
        <PDLKeyword Value=“OFF” />
        <rcNameID Value=“OFF_DISPLAY” />
        <DisplayName xml:lang=“en-US”>OFF</DisplayName>
        <DisplayName xml:lang=“ja-JP”>オフ</DisplayName>
      </FeatureOption>
      <FeatureOption Value=“Left2”>
        <PDLKeyword Value=“Left2” />
        <rcNameID Value=“RC_STR_LEFT2” />
        <DisplayName xml:lang=“en-US”>Left 2</DisplayName>
        <DisplayName xml:lang=“ja-JP”>左2か所</DisplayName>
      </FeatureOption>
      <FeatureOption Value=“Top2”>
        <PDLKeyword Value=“Top2” />
        <rcNameID Value=“RC_STR_TOP2” />
        <DisplayName xml:lang=“en-US”>Top 2</DisplayName>
        <DisplayName xml:lang=“ja-JP”>上2か所</DisplayName>
      </FeatureOption>
      <FeatureOption Value=“Right2”>
        <PDLKeyword Value=“Right2” />
        <rcNameID Value=“RC_STR_RIGHT2” />
        <DisplayName xml:lang=“en-US”>Right 2</DisplayName>
        <DisplayName xml:lang=“ja-JP”>右2か所</DisplayName>
      </FeatureOption>
      <FeatureOption Value=“Left3”>
        <PDLKeyword Value=“Left3” />
        <rcNameID Value=“RC_STR_LEFT3” />
        <DisplayName xml:lang=“en-US”>Left 3</DisplayName>
        <DisplayName xml:lang=“ja-JP”>左3か所</DisplayName>
      </FeatureOption>
      <FeatureOption Value=“Top3”>
        <PDLKeyword Value=“Top3” />
        <rcNameID Value=“RC_STR_TOP3” />
        <DisplayName xml:lang=“en-US”>Top 3</DisplayName>
        <DisplayName xml:lang=“ja-JP”>上3か所</DisplayName>
      </FeatureOption>
      <FeatureOption Value=“Right3”>
        <PDLKeyword Value=“Right3” />
        <rcNameID Value=“RC_STR_RIGHT3” />
```

-continued

```
            <DisplayName xml:lang=“en-US”>Right 3</DisplayName>
            <DisplayName xml:lang=“ja-JP”>右3か所</DisplayName>
        </FeatureOption>
        <FeatureOption Value=“Left4”>
            <PDLKeyword Value=“Left4” />
            <rcNameID Value=“RC_STR_LEFT4” />
            <DisplayName xml:lang=“en-US”>Left 4</DisplayName>
            <DisplayName xml:lang=“ja-JP”>左4か所</DisplayName>
        </FeatureOption>
        <FeatureOption Value=“Top4”>
            <PDLKeyword Value=“Top4” />
            <rcNameID Value=“RC_STR_TOP4” />
            <DisplayName xml:lang=“en-US”>Top 4</DisplayName>
            <DisplayName xml:lang=“ja-JP”>上4か所</DisplayName>
        </FeatureOption>
        <FeatureOption Value=“Right4”>
            <PDLKeyword Value=“Right4” />
            <rcNameID Value=“RC_STR_RIGHT4” />
            <DisplayName xml:lang=“en-US”>Right 4</DisplayName>
            <DisplayName xml:lang=“ja-JP”>右4か所</DisplayName>
        </FeatureOption>
    </DeviceFeature>
    <DeviceFeature Value=“Sides”>
        <PDLKeyword Value=“Duplex” />
        <rcNameID Value=“TWO_SIDED_PRINTING_DISPLAY” />
        <DefaultOption>OneSided</DefaultOption>
        <DisplayName xml:lang=“en-US”>Print on Both Sides</DisplayName>
        <DisplayName xml:lang=“ja-JP”>両面印刷</DisplayName>
        <FeatureOption Value=“OneSided”>
            <PDLKeyword Value=“NONE” />
            <rcNameID Value=“NONE_DISPLAY” />
            <DisplayName xml:lang=“en-US”>None</DisplayName>
            <DisplayName xml:lang=“ja-JP”>なし</DisplayName>
        </FeatureOption>
        <FeatureOption Value=“TwoSidedLongEdge”>
            <PDLKeyword Value=“VERTICAL” />
            <rcNameID Value=“FLIP_ON_LONG_EDGE_DISPLAY” />
            <DisplayName xml:lang=“en-US”>Flip on long edge</DisplayName>
            <DisplayName xml:lang=“ja-JP”>長辺を綴じる</DisplayName>
        </FeatureOption>
        <FeatureOption Value=“TwoSidedShortEdge”>
            <PDLKeyword Value=“HORIZONTAL” />
            <rcNameID Value=“FLIP_ON_SHORT_EDGE_DISPLAY” />
            <DisplayName xml:lang=“en-US”>Flip on short edge</DisplayName>
            <DisplayName xml:lang=“ja-JP”>短辺を綴じる</DisplayName>
        </FeatureOption>
    </DeviceFeature>
  </DeviceFeatures>
<GlobalConstraints />
</PrinterDescriptionData>
```

X. Appendix D

Example Print Capabilities Document

```
<psf:PrintCapabilities
xmlns:psf=“http://schemas.microsoft.com/windows/2003/08/printing/printschemaframework
” xmlns:xsi=“http://www.w3.org/2001/XMLSchema-instance”
xmlns:xsd=“http://www.w3.org/2001/XMLSchema” version=“1”
xmlns:ns0000=“http://schemas.microsoft.com/windows/printing/oemdriverpt/ES_LNseries__
PowerPrinter”
xmlns:psk=“http://schemas.microsoft.com/windows/2003/08/printing/printschemakeywords”
>
  <psf:ParameterDef name=“ns0000:PageDevmodeSnapshot”>
    <psf:Property name=“psf:DataType”>
      <psf:Value xsi:type=“xsd:QName”>xsd:string</psf:Value>
    </psf:Property>
    <psf:Property name=“psf:UnitType”>
      <psf:Value xsi:type=“xsd:string”>base64</psf:Value>
    </psf:Property>
    <psf:Property name=“psf:DefaultValue”>
        <psf:Value
        xsi:type=“xsd:string”>SABQACAARABlAHMDFDFJASKJFDUETgEAAAA=</psf
        :Value>
```

-continued

```
        </psf:Property>
        <psf:Property name=“psf:Mandatory”>
            <psf:Value xsi:type=“xsd:QName”>psk:Optional</psf:Value>
        </psf:Property>
        <psf:Property name=“psf:MinLength”>
            <psf:Value xsi:type=“xsd:integer”>0</psf:Value>
        </psf:Property>
        <psf:Property name=“psf:MaxLength”>
            <psf:Value xsi:type=“xsd:integer”>174760</psf:Value>
        </psf:Property>
    </psf:ParameterDef>
    <psf:Feature name=“psk:JobDuplexAllDocumentsContiguously”>
        <psf:Property name=“psf:SelectionType”>
            <psf:Value xsi:type=“xsd:QName”>psk:PickOne</psf:Value>
        </psf:Property>
        <psf:Property name=“psk:DisplayName”>
            <psf:Value xsi:type=“xsd:string”>Two-sided Printing</psf:Value>
        </psf:Property>
        <psf:Option name=“psk:OneSided” constrained=“psk:None”>
            <psf:Property name=“psk:DisplayName”>
                <psf:Value xsi:type=“xsd:string”>None</psf:Value>
            </psf:Property>
        </psf:Option>
        <psf:Option name=“psk:TwoSidedLongEdge” constrained=“psk:None”>
            <psf:Property name=“psk:DisplayName”>
                <psf:Value xsi:type=“xsd:string”>Flip on long edge</psf:Value>
            </psf:Property>
        </psf:Option>
        <psf:Option name=“psk:TwoSidedShortEdge” constrained=“psk:None”>
            <psf:Property name=“psk:DisplayName”>
                <psf:Value xsi:type=“xsd:string”>Flip on short edge</psf:Value>
            </psf:Property>
        </psf:Option>
    </psf:Feature>
    <psf:Feature name=“ns0000:JobPunching”>
        <psf:Property name=“psf:SelectionType”>
            <psf:Value xsi:type=“xsd:QName”>psk:PickOne</psf:Value>
        </psf:Property>
        <psf:Property name=“psk:DisplayName”>
            <psf:Value xsi:type=“xsd:string”>Punch</psf:Value>
        </psf:Property>
        <psf:Option name=“ns0000:OFF” constrained=“psk:None”>
            <psf:Property name=“psk:DisplayName”>
                <psf:Value xsi:type=“xsd:string”>Off</psf:Value>
            </psf:Property>
        </psf:Option>
        <psf:Option name=“ns0000:Left2” constrained=“psk:DeviceSettings”>
            <psf:Property name=“psk:DisplayName”>
                <psf:Value xsi:type=“xsd:string”>Left 2</psf:Value>
            </psf:Property>
        </psf:Option>
        <psf:Option name=“ns0000:Top2” constrained=“psk:DeviceSettings”>
            <psf:Property name=“psk:DisplayName”>
                <psf:Value xsi:type=“xsd:string”>Top 2</psf:Value>
            </psf:Property>
        </psf:Option>
        <psf:Option name=“ns0000:Right2” constrained=“psk:DeviceSettings”>
            <psf:Property name=“psk:DisplayName”>
                <psf:Value xsi:type=“xsd:string”>Right 2</psf:Value>
            </psf:Property>
        </psf:Option>
        <psf:Option name=“ns0000:Left3” constrained=“psk:DeviceSettings”>
            <psf:Property name=“psk:DisplayName”>
                <psf:Value xsi:type=“xsd:string”>Left 3</psf:Value>
            </psf:Property>
        </psf:Option>
        <psf:Option name=“ns0000:Top3” constrained=“psk:DeviceSettings”>
            <psf:Property name=“psk:DisplayName”>
                <psf:Value xsi:type=“xsd:string”>Top 3</psf:Value>
            </psf:Property>
        </psf:Option>
        <psf:Option name=“ns0000:Right3” constrained=“psk:DeviceSettings”>
            <psf:Property name=“psk:DisplayName”>
                <psf:Value xsi:type=“xsd:string”>Right 3</psf:Value>
            </psf:Property>
        </psf:Option>
        <psf:Option name=“ns0000:Left4” constrained=“psk:DeviceSettings”>
            <psf:Property name=“psk:DisplayName”>
                <psf:Value xsi:type=“xsd:string”>Left 4</psf:Value>
            </psf:Property>
```

-continued

```
    </psf:Option>
    <psf:Option name="ns0000:Top4" constrained="psk:DeviceSettings">
      <psf:Property name="psk:DisplayName">
        <psf:Value xsi:type="xsd:string">Top 4</psf:Value>
      </psf:Property>
    </psf:Option>
    <psf:Option name="ns0000:Right4" constrained="psk:DeviceSettings">
      <psf:Property name="psk:DisplayName">
        <psf:Value xsi:type="xsd:string">Right 4</psf:Value>
      </psf:Property>
    </psf:Option>
  </psf:Feature>
</psf:PrintCapabilities>
```

What is claimed is:

1. A computer-implemented method for printing to a Web services-enabled printing device, comprising:

a print driver executing on a client device and receiving, from a Web services-enabled printing device, first printing device capability data;

in response to receiving the first printing device capability data, the print driver generating a first version of a PrintCapabilities Document;

after generating the first version of the PrintCapabilities Document, the print driver receiving, from the Web services-enabled printing device, second printing device capability data that is different than the first printing device capability data and that specifies a plurality of features and options currently supported by the Web services-enabled printing device;

in response to receiving the second printing device capability data, the print driver generating a second version of the PrintCapabilities Document that is different than the first version of the PrintCapabilities Document;

wherein the first version of the PrintCapabilities Document indicates a first plurality of features that were previously supported by the Web services-enabled printing device;

wherein the second version of the PrintCapabilities Document indicates a second plurality of features that are currently supported by the Web services-enabled printing device;

wherein the first plurality of features are different than the second plurality of features;

wherein data in the first and second versions of the PrintCapabilities Document is represented in XML.

2. The computer-implemented method of claim 1, further comprising:

generating a user interface based on the second version of the PrintCapabilities Document;

in response to one or more user selections, generating a particular document that indicates that an option is selected for each feature of a set of features of the second plurality of features; and performing one or more of:

the print driver generating a print job ticket based at least upon the particular document and causing print data and the print job ticket to be transmitted to the Web services-enabled printing device, or generating a second user interface based at least upon the particular document.

3. The computer-implemented method of claim 2, wherein generating the user interface includes:

an application program that is separate from the print driver generating the user interface after requesting the PrintCapabilities Document from the print driver and receiving the second version of the PrintCapabilities Document from the print driver.

4. The computer-implemented method of claim 1, wherein receiving the second printing device capability data is initiated in response to:

the print driver receiving, from the Web services-enabled printing device, an event notification message that indicates a change with respect to the Web services-enabled printing device, wherein the event notification message conforms to a Web Services Eventing specification; and in response to receiving the event notification message, the print driver sending, to the Web services-enabled printing device, a request message that requests one or more print features supported by the Web services-enabled printing device.

5. The computer-implemented method of claim 1, further comprising installing the print driver on the client device, wherein installing the print driver causes the print driver to receive the first printing device capability data.

6. The computer-implemented method of claim 1, wherein the second plurality of features includes a second particular feature that is not included in the first plurality of features.

7. One or more storage media storing instructions for printing to a Web services-enabled printing device, wherein the instructions, when executed by one or more processors, cause:

a print driver executing on a client device and receiving, from a Web services-enabled printing device, first printing device capability data;

in response to receiving the first printing device capability data, the print driver generating a first version of a PrintCapabilities Document;

after generating the first version of the PrintCapabilities Document, the print driver receiving, from the Web services-enabled printing device, second printing device capability data that is different than the first printing device capability data and that specifies a plurality of features and options currently supported by the Web services-enabled printing device;

in response to receiving the second printing device capability data, the print driver generating a second version of the PrintCapabilities Document that is different than the first version of the PrintCapabilities Document;

wherein the first version of the PrintCapabilities Document indicates a first plurality of features that were previously supported by the Web services-enabled printing device;

wherein the second version of the PrintCapabilities Document indicates a second plurality of features that are currently supported by the Web services-enabled printing device;

wherein the first plurality of features are different than the second plurality of features;

wherein data in the first and second versions of the PrintCapabilities Document is represented in XML.

8. The one or more storage media of claim 7, wherein the instructions include additional instructions which, when executed by the one or more processors, further cause:

generating a user interface based on the second version of the PrintCapabilities Document;

in response to one or more user selections, generating a particular document that indicates that an option is selected for each feature of a set of features of the second plurality of features; and performing one or more of:

the print driver generating a print job ticket based at least upon the particular document and causing print data and the print job ticket to be transmitted to the Web services-enabled printing device, or generating a second user interface based at least upon the particular document.

9. The one or more storage media of claim 8, wherein generating the user interface includes:

an application program that is separate from the print driver generating the user interface after requesting the PrintCapabilities Document from the print driver and receiving the second version of the PrintCapabilities Document from the print driver.

10. The one or more storage media of claim 7, wherein receiving the second printing device capability data is initiated in response to:

the print driver receiving, from the Web services-enabled printing device, an event notification message that indicates a change with respect to the Web services-enabled printing device, wherein the event notification message conforms to a Web Services Eventing specification; and in response to receiving the event notification message, the print driver sending, to the Web services-enabled printing device, a request message that requests one or more print features supported by the Web services-enabled printing device.

11. The one or more storage media of claim 7, wherein the instructions include additional instructions which, when executed by the one or more processors, further cause installing the print driver on the client device, wherein installing the print driver causes the print driver to receive the first printing device capability data.

12. The one or more storage media of claim 7, wherein the second plurality of features includes a second particular feature that is not included in the first plurality of features.

13. An apparatus for printing to a Web services-enabled printing device, the apparatus comprising a memory storing instructions which, when processed by one or more processors, cause:

a print driver executing on a client device and receiving, from a Web services-enabled printing device, first printing device capability data;

in response to receiving the first printing device capability data, the print driver generating a first version of a PrintCapabilities Document;

after generating the first version of the PrintCapabilities Document, the print driver receiving, from the Web services-enabled printing device, second printing device capability data that is different than the first printing device capability data and that specifies a plurality of features and options currently supported by the Web services-enabled printing device;

in response to receiving the second printing device capability data, the print driver generating a second version of the PrintCapabilities Document that is different than the first version of the PrintCapabilities Document;

wherein the first version of the PrintCapabilities Document indicates a first plurality of features that were previously supported by the Web services-enabled printing device;

wherein the second version of the PrintCapabilities Document indicates a second plurality of features that are currently supported by the Web services-enabled printing device;

wherein the first plurality of features are different than the second plurality of features;

wherein data in the first and second versions of the PrintCapabilities Document is represented in XML.

14. The apparatus of claim 13, wherein the instructions include additional instructions which, when executed by the one or more processors, further cause:

generating a user interface based on the second version of the PrintCapabilities Document;

in response to one or more user selections, generating a particular document that indicates that an option is selected for each feature of a set of features of the second plurality of features; and performing one or more of:

the print driver generating a print job ticket based at least upon the particular document and causing print data and the print job ticket to be transmitted to the Web services-enabled printing device, or generating a second user interface based at least upon the particular document.

15. The apparatus of claim 14, wherein generating the user interface includes:

an application program that is separate from the print driver generating the user interface after requesting the PrintCapabilities Document from the print driver and receiving the second version of the PrintCapabilities Document from the print driver.

16. The apparatus of claim 13, wherein receiving the second printing device capability data is initiated in response to:

the print driver receiving, from the Web services-enabled printing device, an event notification message that indicates a change with respect to the Web services-enabled printing device, wherein the event notification message conforms to a Web Services Eventing specification; and in response to receiving the event notification message, the print driver sending, to the Web services-enabled printing device, a request message that requests one or more print features supported by the Web services-enabled printing device.

17. The apparatus of claim 13, wherein the instructions include additional instructions which, when executed by the one or more processors, further cause installing the print driver on the client device, wherein installing the print driver causes the print driver to receive the first printing device capability data.

* * * * *